United States Patent
Matsen et al.

(10) Patent No.: US 9,635,714 B2
(45) Date of Patent: Apr. 25, 2017

(54) INCREMENTAL SHEET FORMING FOR FABRICATION OF COLD SPRAYED SMART SUSCEPTOR

(71) Applicant: The Boeing Company, Chicago, IL (US)

(72) Inventors: Marc R. Matsen, Seattle, WA (US); Carey E. Wilkinson, O'Fallon, MO (US)

(73) Assignee: THE BOEING COMPANY, Chicago, IL (US)

( * ) Notice: Subject to any disclaimer, the term of this patent is extended or adjusted under 35 U.S.C. 154(b) by 1020 days.

(21) Appl. No.: 13/887,756

(22) Filed: May 6, 2013

(65) Prior Publication Data

US 2014/0326717 A1 Nov. 6, 2014

(51) Int. Cl.
*H05B 6/10* (2006.01)
*B21D 31/00* (2006.01)
*C23C 24/04* (2006.01)
*B29C 33/38* (2006.01)
B29C 33/06 (2006.01)

(52) U.S. Cl.
CPC ......... *H05B 6/105* (2013.01); *B21D 31/005* (2013.01); *B29C 33/38* (2013.01); *C23C 24/04* (2013.01); *B29C 33/06* (2013.01); *B29K 2995/0003* (2013.01); *B29K 2995/0008* (2013.01)

(58) Field of Classification Search
CPC ......... H05B 6/105; H05B 6/365; H05B 6/06; B21D 31/005; B29C 33/38; B29C 33/06; C23C 24/04; B29K 2995/0003; B29K 2995/0008

USPC .............. 219/634, 647, 659, 645, 635, 633
See application file for complete search history.

(56) References Cited

U.S. PATENT DOCUMENTS 6,566,635 B1   5/2003  Matsen et al.
6,897,419 B1*  5/2005  Brown ................... H05B 6/365
                                                                219/634

(Continued)

FOREIGN PATENT DOCUMENTS

EP      1462190      9/2004

OTHER PUBLICATIONS

European Patent Office, Extended European Search Report for EP14161463.6 dated Oct. 21, 2014. Oct. 24, 2014.

*Primary Examiner* — Hung D Nguyen
(74) *Attorney, Agent, or Firm* — Parsons Behle & Latimer

(57) ABSTRACT

An induction heating system for manufacturing a part including an induction coil and a smart susceptor positioned within an oscillating electromagnetic field from the induction coil. The smart susceptor includes a ferromagnetic material cold sprayed onto a tool. The tool may be a sheet metal component formed to a desired shape by incremental sheet forming. The smart susceptor may be heated up by eddy currents generated in the ferromagnetic material by the oscillating electromagnetic field. The smart susceptor may be designed to have a desired Curie temperature based on the composition of the ferromagnetic material. The smart susceptor is formed into a desired shape by cold spraying ferromagnetic material onto a tool already formed into the desired shape. The smart susceptor may be removed from the tool by thermally shocking the smart susceptor and the tool and may be used to heat a part to be formed.

14 Claims, 6 Drawing Sheets

(56) References Cited

U.S. PATENT DOCUMENTS

2002/0182311 A1* 12/2002 Leonardi ................ H01F 41/16
                                                    427/128
2005/0035115 A1    2/2005 Anderson et al.
2009/0074905 A1*  3/2009 Matsen ................... B29C 33/06
                                                    219/634
2009/0250834 A1   10/2009 Huskamp et al.

* cited by examiner

INCREMENTAL SHEET FORMING FOR FABRICATION OF COLD SPRAYED SMART SUSCEPTOR

BACKGROUND

Induction heating systems have been used to provide heat for processes such as fabricating parts or components. Induction heating systems typically include a ferromagnetic material that responds to an oscillating electromagnetic field generated by an energized induction coil by generating heat within the ferromagnetic material. Heat is typically conducted from the ferromagnetic element directly to the parts or components. A smart susceptor that includes a ferromagnetic element or material may be heated in an induction heating system to provide a fairly stable temperature to heat the parts or components. The composition of a smart susceptor is typically configured so that the smart susceptor has a specific Curie temperature and thus, will provide a fairly stable temperature when used in an induction heating.

U.S. Pat. No. 6,566,635 to Matsen et al., commonly assigned and incorporated herein by reference, discloses applying a magnetically permeable powder to a mesh structure using a hot spray gun to form a susceptor. Thermal or hot spraying of a magnetically permeable powder melts the sprayed material prior to contacting a target. The thermal application of magnetically permeable powder may limit the composition of powder that may be applied to form a susceptor. The thermal application of the magnetically permeable powder may also subject the sprayed susceptor to oxidation. The application of the magnetically permeable powder to a mesh structure may also limit the geometrical shape of the formed susceptor. The use of a mesh structure may limit the tolerances of the dimensions of the formed susceptor.

SUMMARY

It may be beneficial to form an induction heating smart susceptor by cold spraying a ferromagnetic material cold on to a surface of a tool that may previously be formed into a desired shape by increment sheet forming.

One configuration of an induction heating system for manufacturing a part comprises an induction coil capable of generating an oscillating electromagnetic field and a susceptor positioned in the oscillating electromagnetic field when said induction coil is energized. The susceptor comprises a sheet metal component and a ferromagnetic material cold sprayed onto the sheet metal component. The sheet metal component is formed to a desired shape by incremental sheet forming.

The sheet metal component of the system may be approximately 0.01 to 0.03 inches thick. The sheet metal component of the system may be non-magnetic. The sheet metal component may have a Curie temperature below a Curie temperature of the ferromagnetic material. The ferromagnetic material may be cold sprayed onto the tooling component to a thickness of 0.04 to 0.125 inches thick.

One configuration of a system for forming a cold sprayed smart susceptor comprises a gas control module in communication with a first line and a second line that controls the flow of gas in the first and second lines. The system comprises a nozzle connected to the gas control module by the first line and a heater positioned along the first line between the gas control module and the nozzle. The system comprises a powder feeder positioned along the second line between the gas control module and the nozzle. The flow of gas in the first and second line creates a particle stream of powder out of the nozzle that forms a smart susceptor as it contacts a surface of a tool. The surface of the tool may be formed to a desired shape by incremental sheet forming. The heater positioned along the first line may heat the gas in the first line to between approximately 400 degrees Celsius to 900 degrees Celsius.

One configuration of a method of manufacturing a smart susceptor comprises forming a tooling component and cold spraying a ferromagnetic material on a surface of the tooling component. The ferromagnetic material has a predetermined Curie temperature based on a composition of the ferromagnetic material. Forming the tooling component may comprise forming a non-magnetic sheet of metal to a desired shape using incremental sheet forming. Forming the tooling component may comprise forming the tooling component from a ceramic die. Forming the tooling component may comprise forming the tooling component from a polymer sheet or a composite sheet. Forming the tooling component may comprise forming the tooling component from a sheet of metal having a Curie temperature below the Curie temperature of the ferromagnetic material. The method may comprise applying an oscillating electromagnetic field to the ferromagnetic material to release the ferromagnetic material from the surface of the tooling component. The method may comprise heating a gas flowing to a nozzle used to spray the ferromagnetic material. The method may comprise thermally shocking the tooling component and the ferromagnetic material to release the ferromagnetic material from the surface of the tooling component.

One configuration of a method of manufacturing a part comprises positioning a smart susceptor adjacent to a part, applying an oscillating electromagnetic field to the smart susceptor to generate eddy currents to heat the smart susceptor, and heating the part with the smart susceptor. The smart susceptor is fabricated from cold sprayed ferromagnetic powder disposed on a surface of a tool that has been shaped by incremental sheet forming.

Positioning the smart susceptor adjacent a part may further comprise positioning the smart susceptor into an induction heating system. The method may comprise releasing the smart susceptor from the tool. The smart susceptor may be positioned adjacent to the part after releasing the smart susceptor from the tool.

Figure 1:
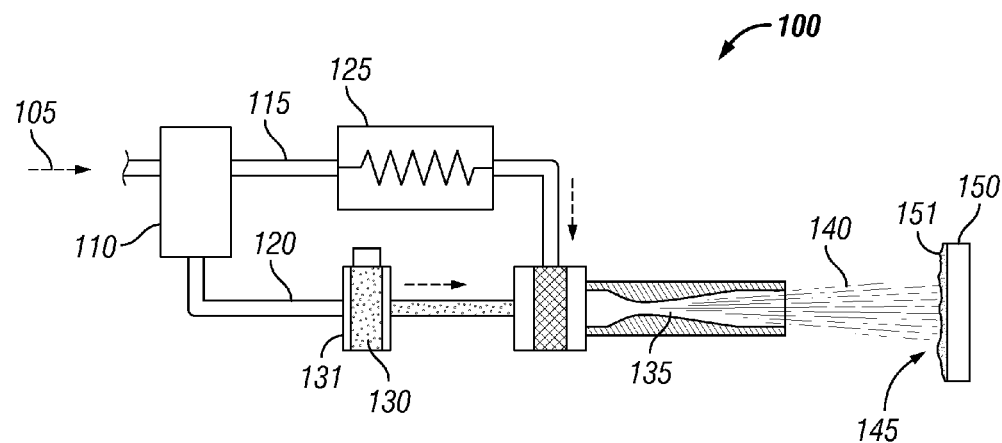
FIG. 1 shows a configuration of a system for cold spraying a ferromagnetic powder onto surface of a tool to form a smart susceptor.

While the disclosure is susceptible to various modifications and alternative forms, specific configurations have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

The configurations described herein relate to a smart susceptor that may be used in an induction heating system for manufacturing a part. The smart susceptor may be formed by cold spraying a material such as a ferromagnetic powder onto a surface of a tool or ceramic die. Cold spraying is defined herein as spraying a material at a temperature that is below the melting point of the material being sprayed. The tool may be formed into a desired shape by incremental sheet forming. The smart susceptor and tool assembly may be positioned within an induction heating system to heat a component by the application of an oscillating electromagnetic field. Alternatively, the smart susceptor may be removed from the surface of the tool and positioned alone within an induction heating system to heat a component by the application of an oscillating electromagnetic field.

FIG. 1 shows a schematic of one configuration of a system 100 that may be used to cold spray a ferromagnetic powder 130 onto a surface or substrate 151 of a tool component or a sheet metal component 150 to form a smart susceptor 145. A source of gas 105, such as nitrogen or helium, is connected to a gas control module 110 that controls the flow of the gas 105 through a first line 115 connected to a nozzle 135 and through a second line 120 connected to a powder chamber 131 and then to the nozzle 135. The gas flowing through the lines 115 and 120 causes ferromagnetic powder 130 located within the powder chamber 131 to be sprayed from the nozzle 135 as a particle stream 140. The particle stream 140 travels at a high velocity from the nozzle 135, which may be a supersonic nozzle, and is deposited on a surface or substrate 151 of a sheet metal component or a tool component 150 (hereinafter referred to as a tool) to form a smart susceptor 145. The particle stream 140 is sprayed at a temperature that is well below the melting point of the ferromagnetic powder 130. The particle stream 140 could be sprayed directly onto a surface of a die to form the smart susceptor 145 on the surface of a die instead of on the surface of a tool 150. The particle stream 140 is sprayed in a supersonic gas jet onto the surface or substrate 151 of the tool 150. On impact on the surface 151, the particles of the particle stream 140 undergo plastic deformation due to the high velocity of the particle stream 140 and bond to each other to form the smart susceptor 145.

The system 100 may include a heater 125 used to heat the gas 105 to a requisite temperature prior to entrance of the gas 105 into the nozzle 135. For example, the gas 105 may be heated to between 400 degrees and 900 degrees Celsius prior to entering the nozzle 135 to spray the powder 130 into a particle stream 140. The heater 125 is used to accelerate the speed of the particle stream 140, but the heat from the heated gas 105 is not transferred to the metallurgical bonding of the particles of the particle stream 140.

The ferromagnetic powder 130 used in the cold spray process may be configured to produce a smart susceptor 145 having a desired Curie temperature, as would be recognized by one of ordinary skill in the art having the benefit of this disclosure. The cold spraying of the powder 130, as opposed to thermal spraying, may permit the use of a larger number of ferromagnetic powders 130 to produce a smart susceptor 145. The ferromagnetic powder 130 may be a mixture of ferromagnetic materials, such as ferromagnetic powders, to produce a smart susceptor 145 having a desired Curie temperature. For example, the ferromagnetic powder may be a mixture of nickel, cobalt, and iron powders or other ferromagnetic powders, to achieve a desired Curie temperature.

The use of a cold spray helps to limit dimension distortion of the smart susceptor due to thermal issues. The cold spray of ferromagnetic powder 130 onto a previously shaped surface permits the rapid creation of a smart susceptor 145 having a desired geometric shape. Incremental sheet forming permits the detailed formatting of a surface having tight dimensional tolerances. The ferromagnetic powder 130 may be cold sprayed to produce a smart susceptor 145 having a desired thickness, such as between approximately 0.04 and 0.125 inches. The cold spraying of the smart susceptor 145 as opposed to thermal spraying may permit the smart susceptor 145 to be comprised of a material that is not durable at high temperatures and/or is susceptible to oxidation at high temperatures. The use of a susceptor 145 on a surface 151 of a tool 150 may aid in the durability at high temperatures as materials used to form a susceptor, in general, may not be durable and may be susceptible to oxidation at high temperatures.

The surface 151 of the tool 150 may be shaped by a process, such as incremental sheet forming, into a desired shape, such as a complex geometric shape. The cold sprayed smart susceptor 145 may be formed into the same shape as the surface 151 of the tool 150. Incremental sheet forming permits the rapid formation of a tool surface 151 having requisite tolerances.

Figure 2:
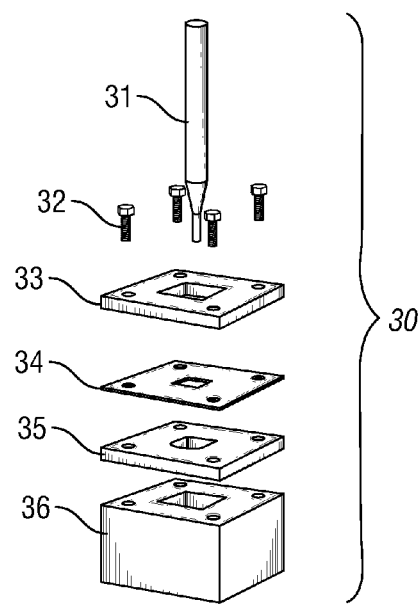
FIG. 2 shows a configuration of a system that may be used in incremental sheet forming a material into a desired shape.

FIG. 2 shows components that may be used in system 30 to perform incremental sheet forming. In the illustrated system 30, a forming tool 31 is used to create small incremental deformations in a workpiece or tool 34 until the tool 34 is formed into the desired geometrical shape. The forming tool 31 is connected to a machine (not shown) to perform the deformations. The machine may be a computer controlled machine that controls the repeated indentations by the forming tool 31 until the tool 34 is formed to the desired geometrical shape. The tool 34 may be held in a rigid fashion between a blankholder 33 and a modular die 35 which may be secured together by fasteners 32. A die support 36 may provide sufficient rigidity to the modular die 35. The use of incremental sheet forming permits the rapid, inexpensive, and accurate forming of a tool 34 upon which ferromagnetic powder 130 may be cold sprayed on to form the smart susceptor 145 having a specified geometry. Incremental sheet forming may be used on a sheet of metal having a thickness of approximately 0.01 inches to 0.03 inches. Incremental sheet forming may also be used to form a sheet of polymer or a sheet of composite material into a desired geometrical shape.

Figure 3:
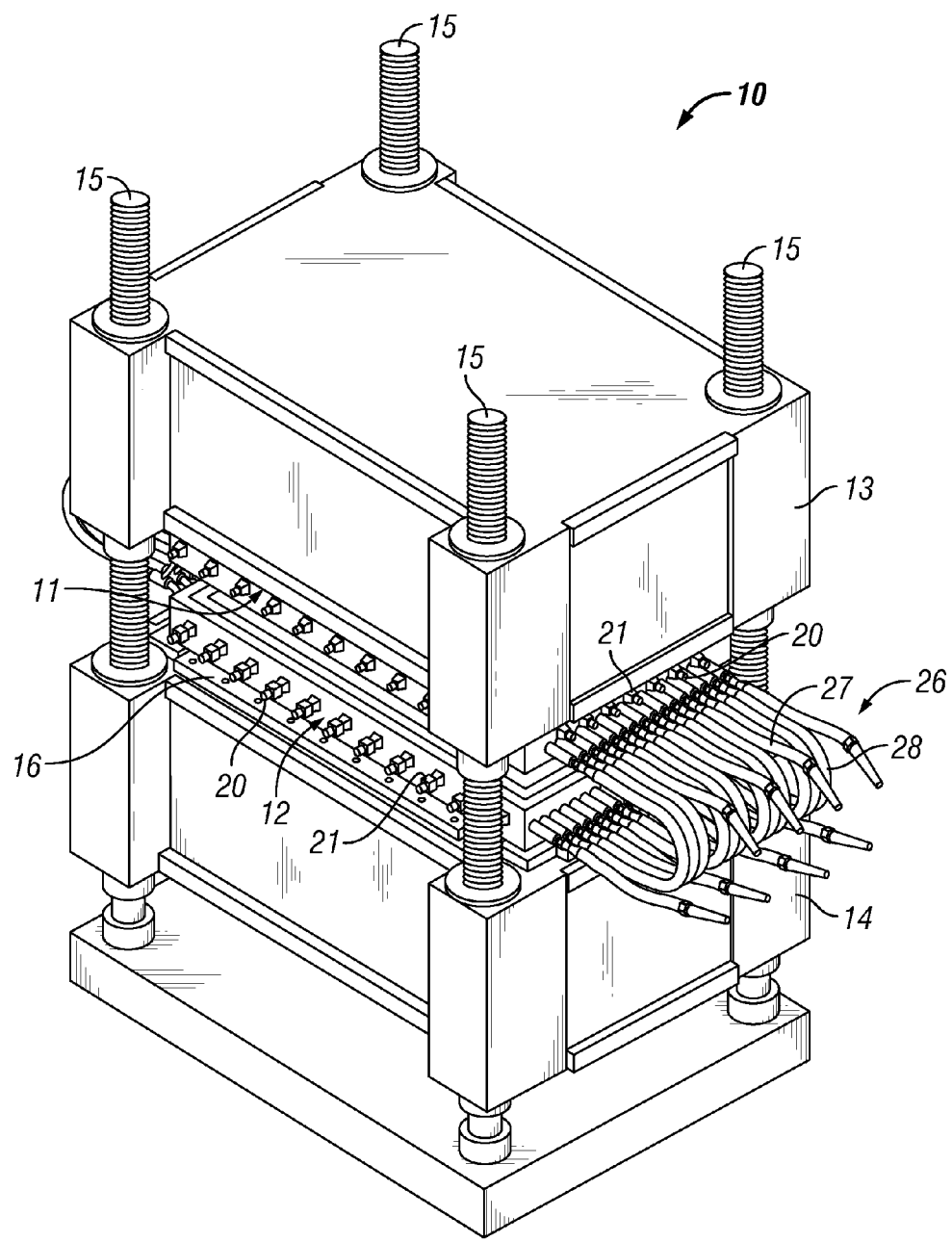
FIG. 3 shows a perspective view of one configuration of an induction heating workcell in which a cold sprayed smart susceptor may be placed to heat a part to be fabricated.
Figure 4:
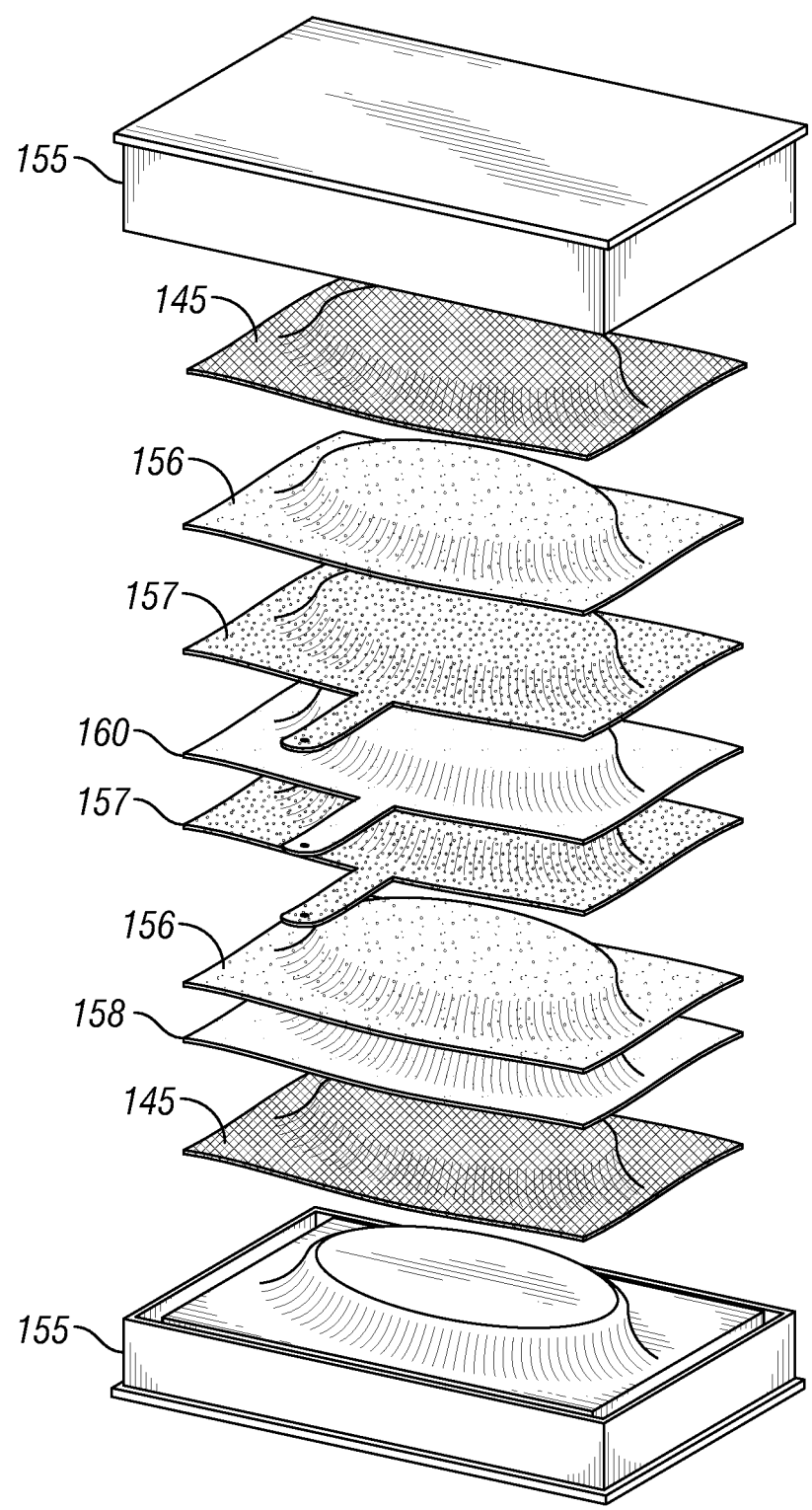
FIG. 4 shows a configuration of a pair of dies and smart susceptors that may be used to form a component.

FIG. 3 shows a workcell 10 in which a cold sprayed smart susceptor 145 (shown in FIG. 4) may be placed to heat up a part or component 160 (shown in FIG. 4). The workcell 10 includes an upper die 11 mounted within an upper strongback 13 and a lower die 12 mounted within a lower strongback 14. The strongbacks 13 and 14 are each threaded onto four threaded column supports, or jackscrews 15 allowing adjustment of the relative positions of the dies 11 and 12 and strongbacks 13 and 14. Together, the dies 11 and 12 define a die cavity that is shaped to hold a smart susceptor 145 that, in turn, surrounds a part 160.

As discussed above, a ferromagnetic powder may be cold sprayed directly onto one of the dies 11 and 12 to form the smart susceptor 145 (shown in FIG. 4). A plurality of induction coils 26 are embedded in the dies 11 and 12, and surround the smart susceptor 145. When energized, the coils 26 generate an oscillating electromagnetic field that causes eddy currents in the smart susceptor 145, which heats up the smart susceptor 145, causing the smart susceptor 145 to generate heat so as to perform a step in manufacturing the part 160, such as forming a metal part, or consolidating a composite part. The smart susceptor 145 will continue to heat up until it reaches the Curie temperature of the ferromagnetic material of the smart susceptor 145. The Curie temperature of the smart susceptor 145 is determined by the properties of the ferromagnetic materials combined to form the smart susceptor 145. Upon reaching the Curie temperature, the ferromagnetic material of the smart susceptor 145 becomes substantially non-magnetic.

The induction heating workcell 10 further includes a set of clamping bars 16 that hold the dies 11 and 12 in place against the strongbacks 13 and 14. The strongbacks 13 and 14 provide a rigid, flat backing surface for the upper and lower dies 11 and 12, which prevents the dies 11 and 12 from bending and cracking during the manufacturing operation. Additionally, the strongbacks 13 and 14 may serve as stiff plates that keep the dies 11 and 12 together and accurately positioned. The strongbacks 13 and 14 may be constructed of steel, aluminum, or any other material capable of handling the loads present during forming or consolidation. Preferably, nonmagnetic materials are used to prevent distortion of the oscillating electromagnetic field produced by the induction coil 26. As an alternative to the use of strongbacks 13 and 14, the dies 11 and 12 themselves may be strong enough to withstand the loads present during forming or consolidation.

Each of the dies 11 and 12 may include a rectangular block of ceramic material reinforced by a set of fiberglass rods 20 and a set of support plates. The support plates preferably comprise a set of phenolic boards arranged in the shape of a rectangular box framing each ceramic block. A set of nuts 21 are tightened on the threaded ends of the fiberglass rods 20 to apply a compressive load on the phenolic boards. The induction coils 26 are embedded into the ceramic blocks and are positioned between the fiberglass rods 20 and surround the die cavity. The coils 26 may also remove thermal energy by serving as a conduit for a coolant fluid. The coils 26 may include straight tubing sections 27 connected by flexible tubing sections 28. The flexible tubing sections 28 connect the straight tubing sections 27 and may allow the dies 11 and 12 to be separated.

FIG. 4 shows a pair of dies 155 that may be used to form a part 160 using a cold sprayed smart susceptor 145. As discussed above, the smart susceptor 145 is formed by cold spraying ferromagnetic powder 130 onto the surface 151 of a tool 150, or die, that has a desired geometrical shape so that the smart susceptor 145 also is formed with the desired geometric shape. The smart susceptor 145 may then be removed from the tool 150 to form a part 160 in an induction heating system. Alternatively, the smart susceptor 145 along with the tool 150 may be inserted into a heat induction system to form a part 160. A spacer 156, a die insert 157, and/or a bladder 158 may also be inserted in between the smart susceptor 145 and the part 160 to be formed. The dies 155 are formed to create a cavity to hold the part 160 the cold sprayed smart susceptor(s) 145 as well as any additional processing components within an induction heating system. The cold sprayed smart susceptor(s) 145 are then heated to impart heat to the part 160 by the application of an oscillating electromagnetic field, as would be appreciated by one of ordinary skill in the art having the benefit of this disclosure.

Figure 5:
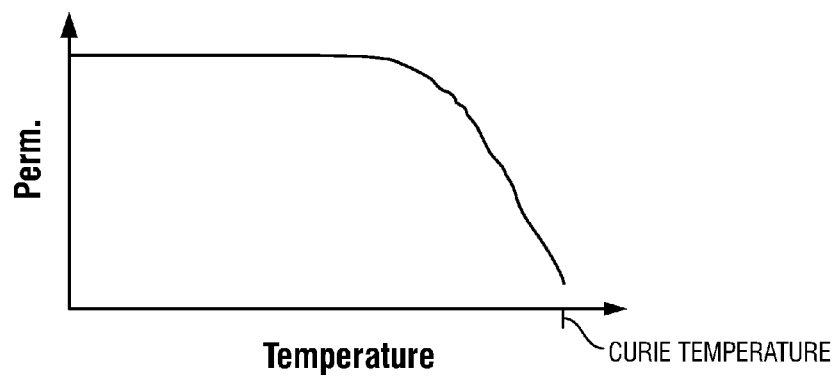
FIG. 5 is a graph showing a decrease in magnetic permeability of the ferromagnetic material of a cold sprayed smart susceptor as the temperature of the ferromagnetic element increases.

As discussed above, the ferromagnetic material 130 of the smart susceptor 145 becomes substantially non-magnetic when it reaches the Curie temperature. As the shown in FIG. 5, the magnetic permeability of the ferromagnetic material 130 suddenly decreases when the ferromagnetic material 130 reaches the Curie temperature. The sudden drop in magnetic permeability results in a distortion of the eddy currents generated by the induction coil. The ferromagnetic material 130 below the Curie temperature may continue to generate eddy currents.

Figure 6:
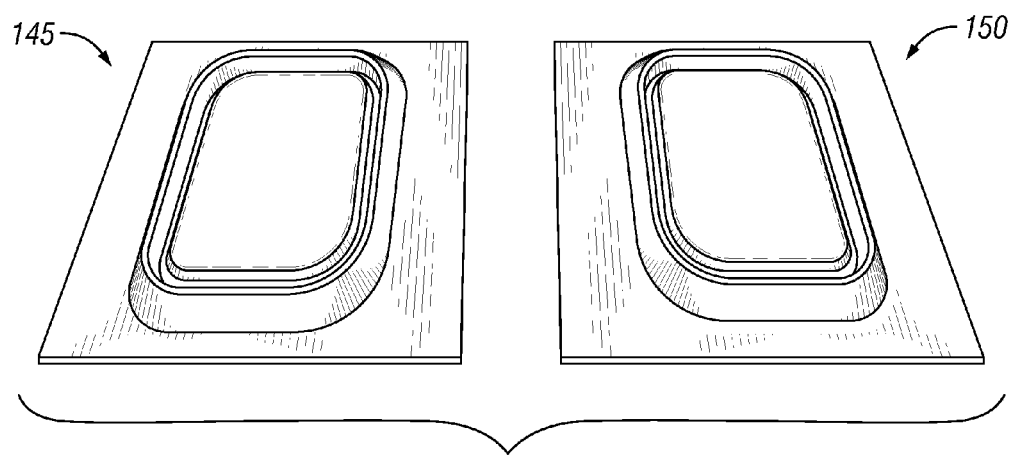
FIG. 6 is perspective view of a cold sprayed smart susceptor released from the surface of a tool used to form the shape of the cold sprayed smart susceptor.

FIG. 6 shows a cold sprayed smart susceptor 145 that has been separated from a tool 150 used to form the smart susceptor 145 with a desired geometric shape. After cold spraying ferromagnetic powder 130 onto the surface 151 of the tool 150 to form the smart susceptor 145, the smart susceptor 145 may be removed from the tool 150 by thermally shocking the smart susceptor 145 and the tool 150. The tool 150 and the smart susceptor 145 have different thermal expansion properties and thus, will permit the separation of the two components when thermally shocked. The smart susceptor 145 and tool 150 may be heated by various means to separate the smart susceptor 145 from the tool 150 due to their different thermal expansion properties. For example, the smart susceptor 145 may be separated from the tool 150 by the application of an oscillating electromagnetic field to the smart susceptor 145 and the tool 150. The cold spraying of ferromagnetic powder 130 to form a smart susceptor 145 permits the formation of a smart susceptor 145 with a desired geometric shape that may be used alone in an induction heating system after removing the smart susceptor 145 from the formation tool 150. In some applications it may be preferred to use both the smart susceptor 145 and formation tool 150 to heat a part 160. For example, the formation tool 150 may aid in the durability of the smart susceptor 145 at high temperatures.

Figure 7:
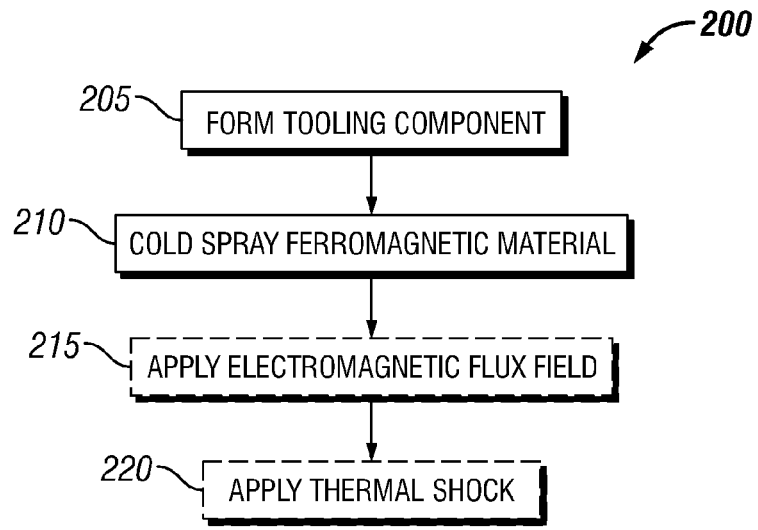
FIG. 7 is a flow chart of a process for forming a cold sprayed smart susceptor.

FIG. 7 shows a method 200 of manufacturing a smart susceptor that includes the step 205 of forming a tooling component. The tooling component may be formed by incremental sheet forming, as discussed above. Incremental sheet forming may be used to form a tool out of sheet metal, a polymer sheet, or a composite sheet. The tooling component may be a ceramic die. The method 200 includes the step 210 of cold spraying a ferromagnetic material to a surface of the tooling component. The ferromagnetic material may be a ferromagnetic powder having a predetermined Curie temperature. For example, the ferromagnetic powder may be a mixture of various powders, such as cobalt, nickel, chromium, Molybdenum, Manganese, iron, and/or other ferromagnetic materials having a predetermined Curie temperature based on the composition of the mixture of powders. The method 200 may optionally include a step 215 of applying an oscillating electromagnetic field to the ferromagnetic material to release the ferromagnetic material from the surface of the tooling component. The application of an oscillating electromagnetic field to the ferromagnetic material may add some vibrational forces that aid in the separation in addition to the difference in thermal expansion. The method 200 may optionally include a step 220 of thermally shocking the tooling component and the ferromagnetic material to release the ferromagnetic material from the surface of the tooling component.

Figure 8:
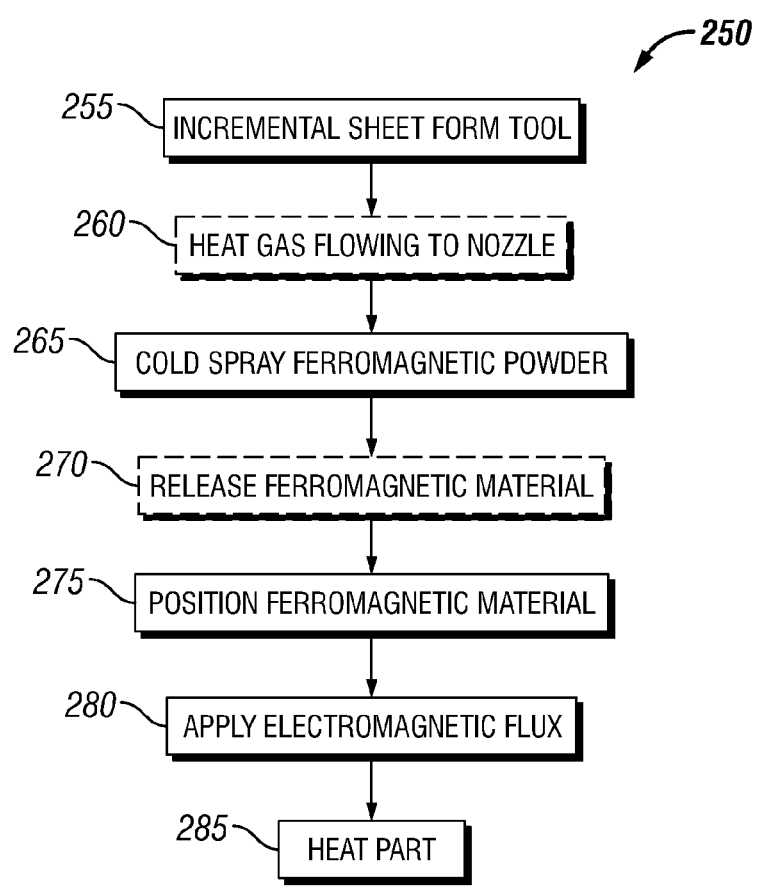
FIG. 8 is a flow chart of a process for forming a composite part using a cold sprayed smart susceptor.

FIG. 8 shows a method 250 of manufacturing a part that includes the step 255 of incremental sheet forming a tool of a desired shape. The part may comprise a composite part. The method 250 includes the optional step 260 of heating a gas flowing to a nozzle used to spray ferromagnetic powder. The method 250 includes the step 265 of cold spraying a ferromagnetic powder onto a surface of the tool having the desired shape to form a smart susceptor. The method 250 includes the optional step 270 of releasing the smart susceptor from the surface of the tool. The method 250 includes the step 275 of positioning the smart susceptor adjacent to a part and the step 280 of applying an oscillating electromagnetic field to the smart susceptor to generate eddy currents to heat up the smart susceptor. The method 250 includes the step 285 of heating up the part with the heat generated from the smart susceptor.

Figure 9:
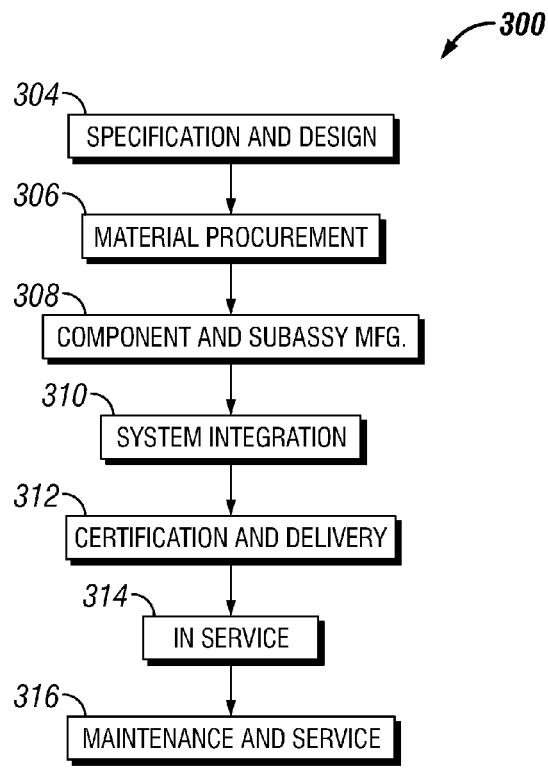
FIG. 9 is an illustration of a flow diagram of an aircraft production and service methodology.
Figure 10:
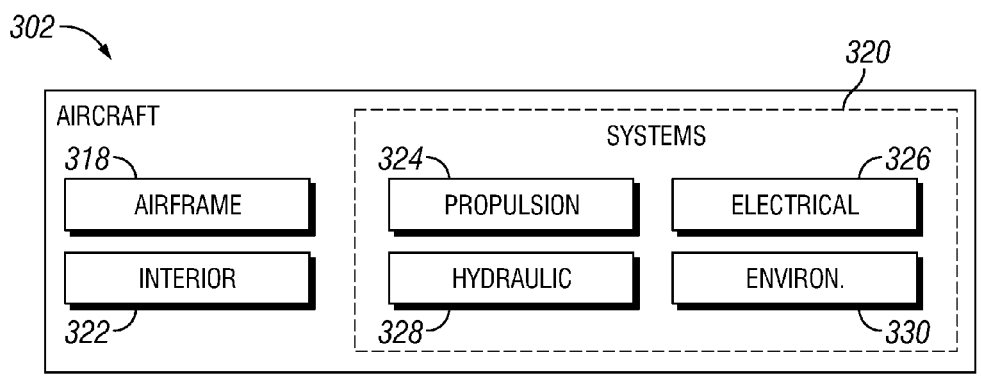
FIG. 10 is an illustration of a block diagram of an aircraft.

Referring to FIGS. 9-10, embodiments of the disclosure may be described in the context of an aircraft manufacturing and service method 300 as shown in FIG. 9 and an aircraft 302 as shown in FIG. 10. During pre-production, exemplary method 300 may include specification and design 304 of the aircraft 302 and material procurement 306. During production, component and subassembly manufacturing 308 and system integration 310 of the aircraft 302 takes place. Thereafter, the aircraft 302 may go through certification and delivery 312 in order to be placed in service 314. While in service 314 by a customer, the aircraft 302 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 302 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems may be included. Although an aerospace example is shown, the principles of the disclosed embodiments may be applied to other industries, such as the automotive industry.

Apparatus and methods embodied herein may be employed during any one or more of the stages of the production and service method 300. For example, components or subassemblies corresponding to production process 308 may be fabricated or manufactured in a manner similar to components or subassemblies produced while the aircraft 302 is in service 314. Also, one or more apparatus embodiments, method embodiments, or a combination thereof may be utilized during the production stages 308 and 310, for example, by substantially expediting assembly of or reducing the cost of an aircraft 302. Similarly, one or more of apparatus embodiments, method embodiments, or a combination thereof may be utilized while the aircraft 302 is in service 314, for example and without limitation, to maintenance and service 316.

Although this disclosure has been described in terms of certain preferred configurations, other configurations that are apparent to those of ordinary skill in the art, including configurations that do not provide all of the features and advantages set forth herein, are also within the scope of this disclosure. Accordingly, the scope of the present disclosure is defined only by reference to the appended claims and equivalents thereof.

What is claimed is:

1. An induction heating system for part manufacturing, the induction heating system comprising:
    an induction coil capable of generating an oscillating electromagnetic field; and
    a susceptor positioned to be in the oscillating electromagnetic field when said induction coil is energized, the susceptor comprising:
        an incrementally deformed sheet metal component incrementally formed to a desired shape, wherein a forming tool incrementally deforms the sheet metal component until formed to the desired shape; and
        a releasable ferromagnetic material cold sprayed onto the sheet metal component, and released from the sheet metal component when the induction coiled generates an oscillating electromagnetic field, or by the application of a thermal shock.

2. The induction heating system of claim 1, wherein the sheet metal component is approximately 0.01 to 0.03 inches thick.

3. The induction heating system of claim 1, wherein the sheet metal component is non-magnetic.

4. The induction heating system of claim 1, wherein the sheet metal component has a Curie temperature below a Curie temperature of the ferromagnetic material.

5. The induction heating system of claim 1, wherein the ferromagnetic material cold sprayed onto the sheet metal component is approximately 0.04 to 0.125 inches thick.

6. A method of manufacturing a smart susceptor, the method comprising:
    forming a tooling component, wherein forming the tooling component comprises forming a sheet of metal to a desired shape using incremental sheet forming;
    cold spraying a ferromagnetic material on a surface of the tooling component, the ferromagnetic material having a predetermined Curie temperature based on a composition of the ferromagnetic material; and
    releasing the ferromagnetic material from the surface of the tooling component, wherein the releasing the ferromagnetic material comprises applying an oscillating electromagnetic field to the ferromagnetic material to release the ferromagnetic material from the surface of the tooling component or thermally shocking the tooling component and the ferromagnetic material to release the ferromagnetic material from the surface of the tooling component.

7. The method of claim 6, wherein forming the tooling component further comprises forming a non-magnetic sheet of metal to the desired shape using incremental sheet forming.

8. The method of claim 6, wherein forming the tooling component further comprises forming the tooling component from a sheet of metal having a Curie temperature below the Curie temperature of the ferromagnetic material.

9. The method of claim 6 further comprising heating a gas flowing to a nozzle used to spray the ferromagnetic material.

10. The method of claim 6, using incremental sheet forming further comprises incrementally deforming the sheet of metal with a forming tool until the sheet of metal is formed to the desired shape.

11. A method of manufacturing a part, the method comprising:
- positioning a smart susceptor adjacent to a part, the smart susceptor fabricated from cold sprayed ferromagnetic powder disposed on a surface of a tool that has been shaped by incremental sheet forming;
- applying an oscillating electromagnetic field to the smart susceptor to generate eddy currents to heat the smart susceptor;
- heating the part with the smart susceptor; and
- releasing the ferromagnetic powder from the surface of the tool, wherein releasing the ferromagnetic powder from the tool comprises applying an oscillating electromagnetic field to the smart susceptor to release the ferromagnetic powder from the tool or thermally shocking the smart susceptor and the tool to release the ferromagnetic powder from the tool.

12. The method of claim 11, wherein positioning the smart susceptor adjacent a part further comprises positioning the smart susceptor into an induction tooling system.

13. The method of claim 11, positioning the smart susceptor formed of the ferromagnetic powder adjacent to the part after releasing the ferromagnetic powder from the tool.

14. The method of claim 11, further comprising incrementally deforming the surface of the tool with a forming tool.

* * * * *